April 13, 1965 H. O. WOOLLEY, JR 3,178,573
X-RAY DATA GATHERING AND PLOTTING METHOD AND APPARATUS
Filed Oct. 3, 1962 6 Sheets-Sheet 1

April 13, 1965   H. O. WOOLLEY, JR   3,178,573
X-RAY DATA GATHERING AND PLOTTING METHOD AND APPARATUS
Filed Oct. 3, 1962   6 Sheets-Sheet 2

April 13, 1965    H. O. WOOLLEY, JR    3,178,573
X-RAY DATA GATHERING AND PLOTTING METHOD AND APPARATUS
Filed Oct. 3, 1962    6 Sheets-Sheet 4

April 13, 1965   H. O. WOOLLEY, JR   3,178,573
X-RAY DATA GATHERING AND PLOTTING METHOD AND APPARATUS
Filed Oct. 3, 1962   6 Sheets-Sheet 6

United States Patent Office 3,178,573
Patented Apr. 13, 1965

3,178,573
X-RAY DATA GATHERING AND PLOTTING
METHOD AND APPARATUS
Harold O. Woolley, Jr., Hershey, Pa., assignor to
AMP Incorporated, Harrisburg, Pa.
Filed Oct. 3, 1962, Ser. No. 228,091
5 Claims. (Cl. 250—51.5)

This invention relates to methods and apparatus of obtaining, integrating, and plotting data. The embodiments of the invention described in detail hereinbelow are particularly intended for gathering integrating and plotting X-ray data on metallic specimens, however it will be apparent that the principles of the invention are applicable to other data or information obtaining devices.

An object of the invention is to provide an improved method and apparatus for obtaining or gathering, integrating, and plotting data. A further object is to provide a method and apparatus for gathering, integrating, and simultaneously plotting data obtained from a radiant energy data gathering means such as an X-ray apparatus. A more specific object is the achievement of an improved method and apparatus for plotting pole figures to show grain orientation in polycrystalline specimens. A further object is to provide a method and apparatus for plotting plating thickness data of specimens.

These and other objects of the invention are achieved in a preferred embodiment comprising a data gathering device (such as X-ray apparatus) for continuously directing a signal to a specimen and a detector means, such as a scintillation counter, for continuously detecting a resultant signal from the specimen. The resultant signal from the specimen constitutes an intensity variable of the data being obtained and plotted. Means are provided for continuously scanning the specimen with the incident signal in accordance with a predetermined scanning plan, this scanning plan being represented by a pair of spacial positional variables. These spacial positional variables can then be mathematically represented by a suitable coordinate system such as an X—Y system or a polar coordinate system. During the scanning of the specimen by the data gathering means, a sensitized sheet or film is scanned with an energy source such as a light source along a scanning path which is coordinately representative of the pairs of spacial positional variables of the specimen scanning plan. The scanning means for the film is synchronized with the scanning means for the specimen so that in effect, a trace of the scanning plan of the specimen is produced. The resultant signal from the specimen is detected and the intensity of the radiant energy source which scans the film is varied during scanning in response to variations in the resultant signal so that the film is exposed to varying degrees representative of the intensity variable and coordinately related to each of the two spacial positional variables. The invenvention thus permits the continuous plotting of a data stream consisting of two positional variables and one intensity variable while it is obtained and gathered. As will be apparent from the detailed description of the invention given below, the invention eliminates the necessity for an intermediate plotting step although the apparatus required is extremely simple and easily operated.

Figure 7:
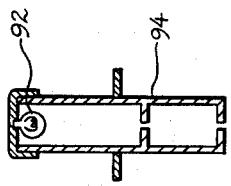
Figure 8:
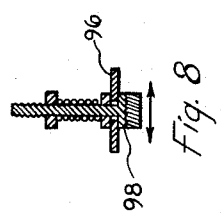
Figure 6:
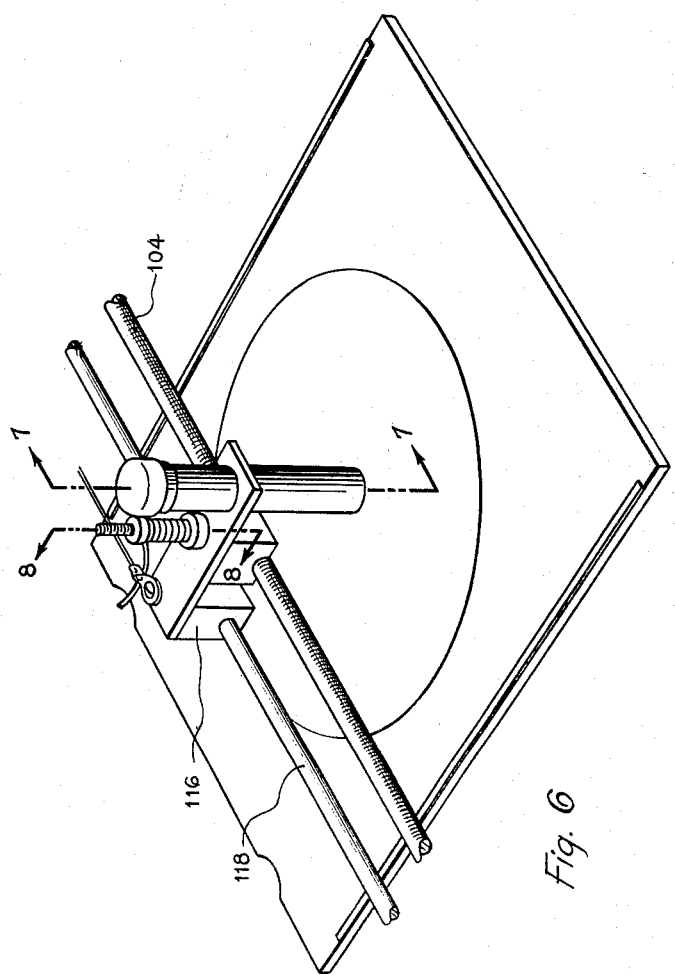
FIGURE 6 is an enlarged perspective view of the film holder and the scanning head of the plotting apparatus shown in FIGURE 4.

FIGURES 7 and 8 are views taken along the lines 7—7 and 8—8 of FIGURE 6.

Figure 9:
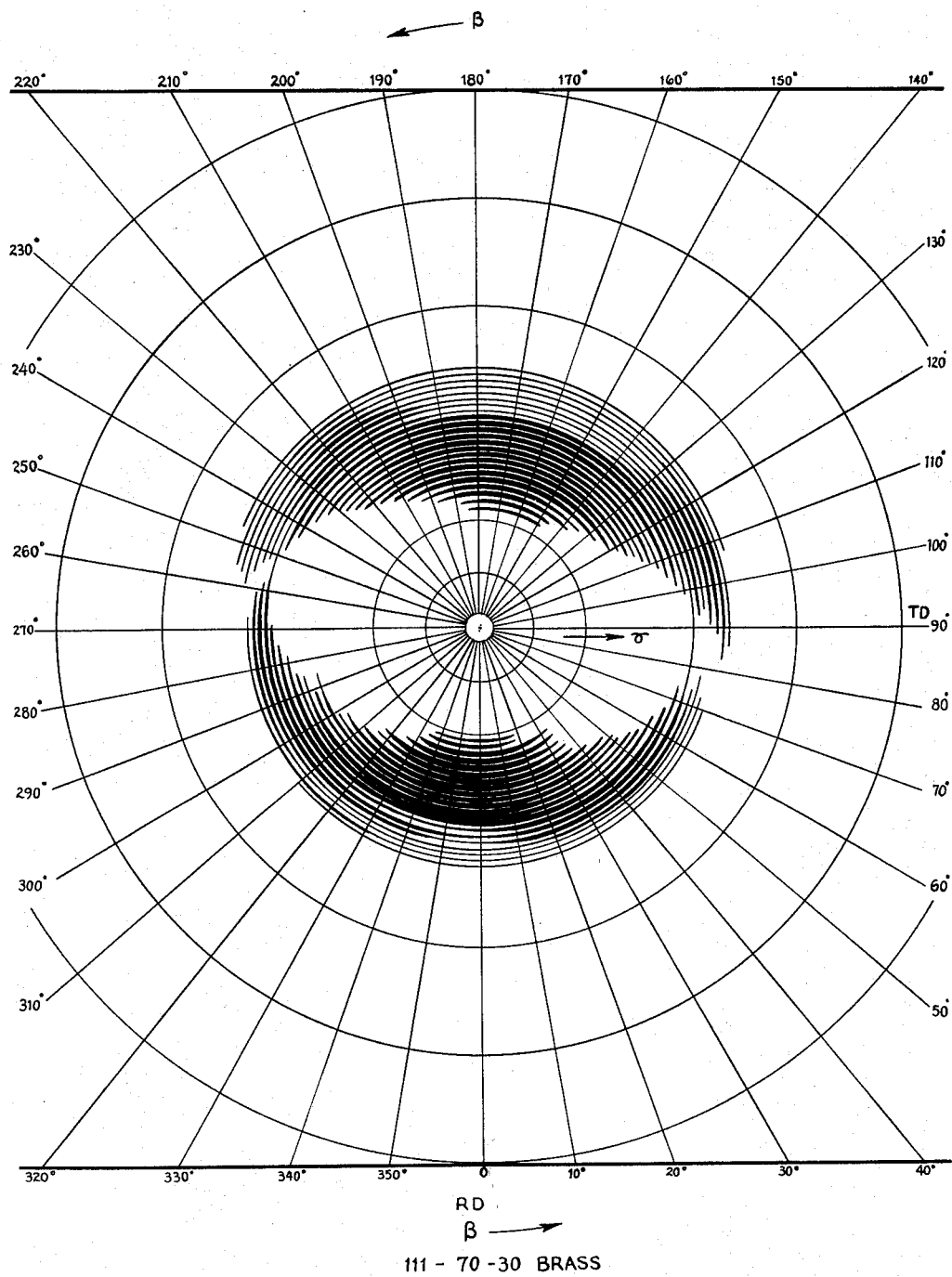

FIGURE 9 shows a pole figure plotted by the apparatus of FIGURES 1-8.

Figure 10:
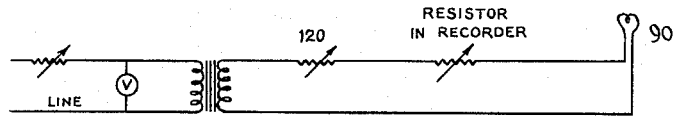

FIGURE 10 is schematic wiring diagram for the preferred embodiment.

Figure 11:
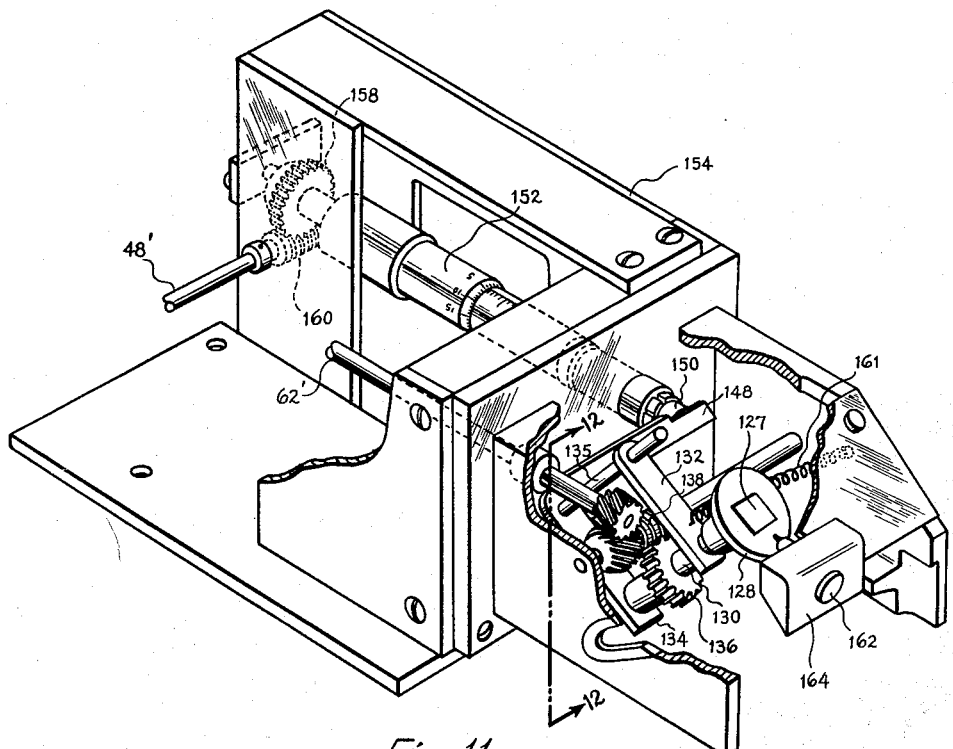

FIGURE 11 is a perspective view of a goniometer used in an alternative embodiment of the invention.

Figure 12:
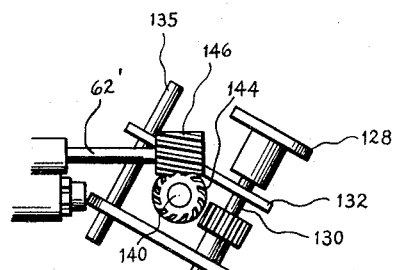

FIGURE 12 is a cross sectional view taken along the lines 12—12 of FIGURE 11.

FIGURES 1-7 of the drawing show one form of the invention for producing diffraction pole figures of polycrystalline metallic specimens directly on a photographic film while the X-ray reflection data for the pole figure are being obtained. Pole figures of this type show preferred orientations, or lack of preferred orientations, in polycrystalline specimens at a glance and therefore present a potentially useful device for studying the effect of anisotrophy as related to, for example, plastic flow or magnetic properties in metals. This device of pole figure representations of preferred grain orientations has been known for years. However, the difficulty of obtaining and plotting pole figure data has severely limited the extent of use of pole figures as a metallurgical tool. For example, some of the earlier methods of arriving at a pole figure for a particular specimen required numerous photographic records of X-ray reflection data of the specimen, mathematical correction of the data, and finally plotting of the data on a pole figure chart. One author (A. Taylor, X-Ray Metallography, John Wiley & Sons, New York, 1961, page 624) states that a total of forty hours are required on the average to produce a complete pole figure by these early methods. A more recent method of obtaining pole figures is described by Geisler in U.S. Patent 2,713,125 and in "Crystal Orientation and Pole Figure Determination," published in Modern Researched Techniques in Physical Metallurgy, American Society for Metals, Cleveland, Ohio, 1953, page 131. According to the method described in these Geisler publications, the specimen is scanned in a manner described below with an X-ray beam, the reflected beam from the specimen is detected by a counter, the intensity of the reflected beam is continuously plotted by means of a recorder on an X—Y coordinate chart, and the intensity peaks of the X—Y coordinate chart are replotted on a stereographic chart. This method offers a considerable improvement over the previous methods in that it permits continuous scanning and data recording but is still relatively slow for the reason that the speed with which the data can be gathered is limited by the speed of the recorder and the data printed on the chart of the recorder must be then be transposed to a pole figure chart. The time required for obtaining even a minimum amount of data for a pole figure in accordance with this method has been stated by Geisler to be about two hours and a half although usually twice as much time is used in the data obtaining step in order to achieve improved definition. The time required for the data plotting step is substantial and increases with the number of data points obtained.

A preferred embodiment of the present invention described below substantially reduces the amount of time required to obtain a pole figure and completely eliminates the necessity of plotting the data so that the technician obtaining a pole figure of a given specimen need merely mount the specimen in the apparatus and set the apparatus in motion.

Figure 1:
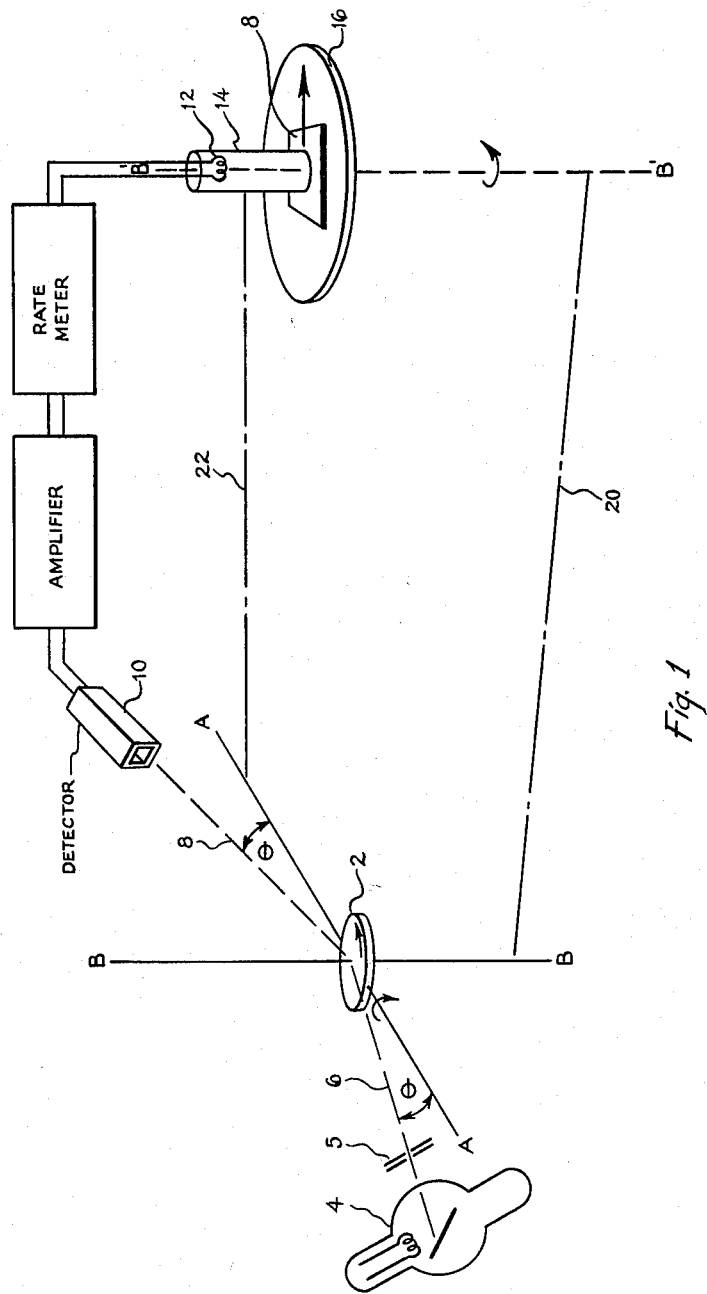
FIGURE 1 is a schematic representation of a apparatus in accordance with the invention, this particular type of apparatus being intended to obtain the data for an orientation pole figure of the polycrystalline specimen and simultaneously plot the data as a pole figure.
Figure 3:
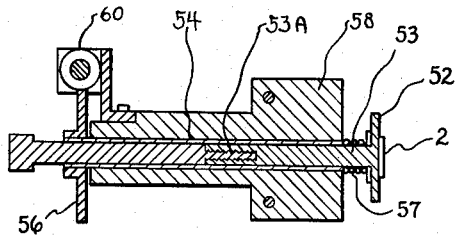
FIGURE 3 is a view taken along the lines 3—3 of FIGURE 2.

Referring now to FIGURE 1, the metallic specimen 2 for which a pole figure is to be determined is mounted in a goniometer of a type described below which rotates the specimen continuously about an axis B—B extending normally through its plane and simultaneously tilts the specimen about an axis A—A extending in its plane. The tilt of the specimen about axis A—A and the rotation of the specimen about the axis B—B thus constitute a pair of positional variables which can be represented on a stereographic chart (FIGURE 9) where $\alpha$ represents the tilt angle and $\beta$ the rotational position of the specimen. Any point on this chart thus corresponds to a given specimen orientation of a particular tilt and rotational position. For reasons which will be apparent as the description proceeds, the rate of rotation of specimen 2 about axis B—B is substantially greater than the rate of tilting about axis A—A; for example, the specimen may be tilted 2½° about axis A—A during each complete revolution of 360° of the specimen about the axis B—B.

An X-ray beam 6 emanating from a source of X-radiation 4 passes through collimating slits 5 and impinges on the surface of the specimen at a predetermined angle of incidence $\theta$. The reflected X-ray beam 8 from the specimen which also subtends an angle $\theta$ with the specimen plane is detected by a suitable detector 10, such as scintillation counter, continuously during rotation and tilting of the specimen.

The angle of incidence $\theta$ is chosen in accordance with the Bragg equation $$n\lambda = 2d \sin \theta$$

where $\lambda$=the wave length of the X-rays, $d$=the interplanar distance of the series of planes of atoms in the crystallites under study, and $n$=a small integer. In accordance with this method of determining preferred orientations of crystallites in the specimen, the intensity of the reflected beam 8 will be strong if the conditions of the Bragg equation are satisfied under some particular conditions of rotation and tilt of the specimen 2.

The output signal from the detector 10 is amplified in an amplifier and then counted in a conventional rate meter having an output voltage which is proportional to the intensity of the reflected beam 8. This output voltage of the rate meter controls the intensity of an incandescent lamp 12 contained in a housing 14 disposed above a sheet of sensitized film 18 on a film holder 16. It will thus be apparent that the intensity of the light from the lamp 12 will be proportional to the intensity of the reflected beam 8. A mechanism schematically indicated at 22 is provided to move the housing 14 along a straight-line path over the surface of the film as indicated by the arrow at a rate which is directly related to the rate of tilting of specimen 2 about axis A—A. An additional mechanism 20 is provided to rotate the film holder 16 about axis B'—B' extending normally of the film and film holder at the same angular velocity as the specimen 2 is rotated about its axis B—B. The light beam from the lamp 12 will thus trace an Archimedean spiral path over the surface of the photographic film in a manner such that any particular point on this path constitutes a polar coordinate representation of a particular orientation, $\alpha$-tilt, $\beta$-rotation, of the specimen. Since the intensity of the lamp 12 varies during tracing of this spiral on the film in response to variations in the intensity of the reflected X-rays 8, the film itself is exposed to varying degrees and a latent image of the pole figure is produced on the film. The film can then be developed to produce a pole figure.

Figure 2:
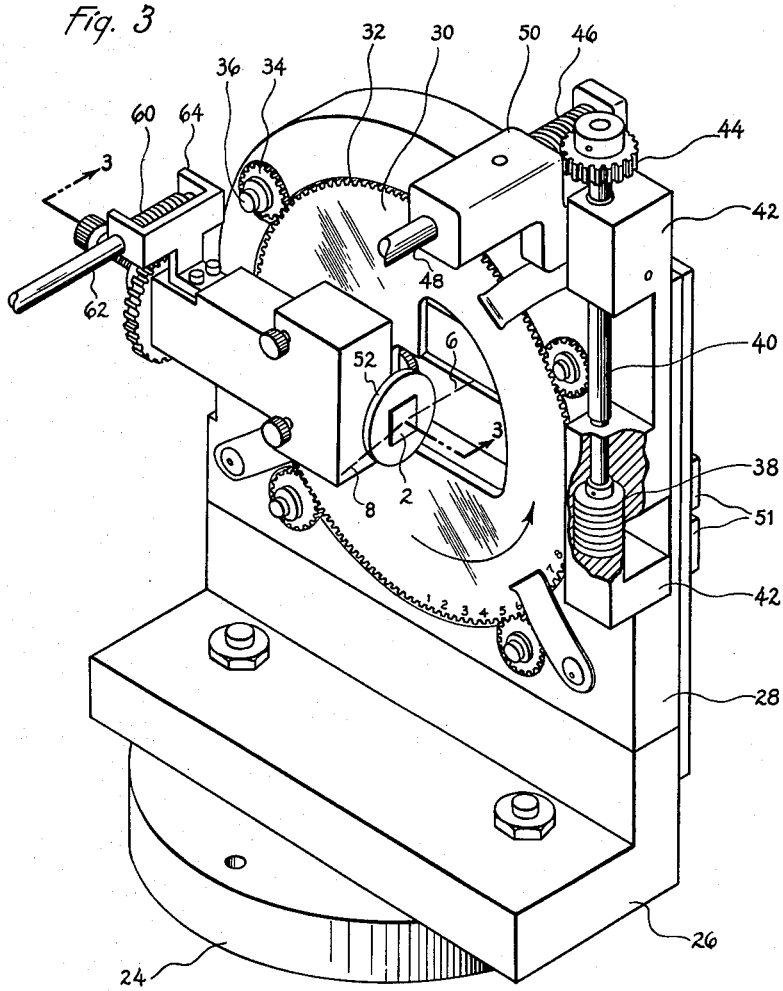
FIGURE 2 is a perspective view of a pole figure goniometer which is used in the embodiment of FIGURE 1.

There will now be described a specific form of apparatus in accordance with the schematic representation of FIGURE 1. FIGURE 2 shows a pole figure goniometer which rotates and simultaneously tilts the specimen 2.

The goniometer is mounted on a base 24 which is adapted to be mounted on the stage of an X-ray apparatus and a bracket 26 which supports the goniometer is secured to the base. The goniometer itself is contained within an upstanding plate 28 having a centrally located circular opening in which a gear ring 30 is mounted, this gear ring having teeth 32 on its periphery which mesh with a plurality of idler gears 34 mounted on stub shafts 36. Rotational movement is imparted to the ring 30 by means of a worm 38 on a shaft 40 which is rotatably mounted in bearings 42 of the frame 28 and which meshes with gear teeth 32. At its upper end, shaft 40 has a worm gear 44 secured thereto which meshes with a worm 46 on a shaft 48 supported in a bearing block 50 secured to a frame 28.

A specimen mounting plate 52 is disposed with its plane extending normally of the plane of ring 30 and with its geometric center of rotation on the axis of ring 30. Parallel plates 51 are provided on the opposite side of ring 30 from the specimen plate 52 to form a slit through which the incident X-ray beam 6 passes for collimating purposes. Specimen plate 52 is mounted on a spindle 53 which extends through shaft 54 rotatably contained in housing 58 mounted on ring 30. Spindle 53 is formed in two parts which are connected by a threaded plug and socket arrangement 53a which permits axial adjustment of the specimen holder 52 in order to position the surface of the specimen precisely on the axis of the ring 30. A spring 57 is interposed between the block 58 and the specimen mounting plate to prevent accidental rotation of the spindle relative to the shaft 54 under the influence of vibration after adjustment. The spindle 53 fits within the shaft 54 sufficiently tightly so that the spindle rotates with the shaft when the latter member is rotated as described below. At its opposite end shaft 54 has a worm gear 56 secured thereto which meshes with a worm 60 on the end of a shaft 62 which is supported in a bracket 64 on block 58. Thus, rotation of shaft 48 will cause the ring 30 and the housing 58 to rotate about an axis extending normally of the plane of the ring (the axis A—A of FIGURE 1) while rotation of the shaft 62 will impart a rotation to the specimen mounting plate 52 in its own plane, as indicated by the rotation of the specimen about axis B—B in FIGURE 1.

Figure 4:
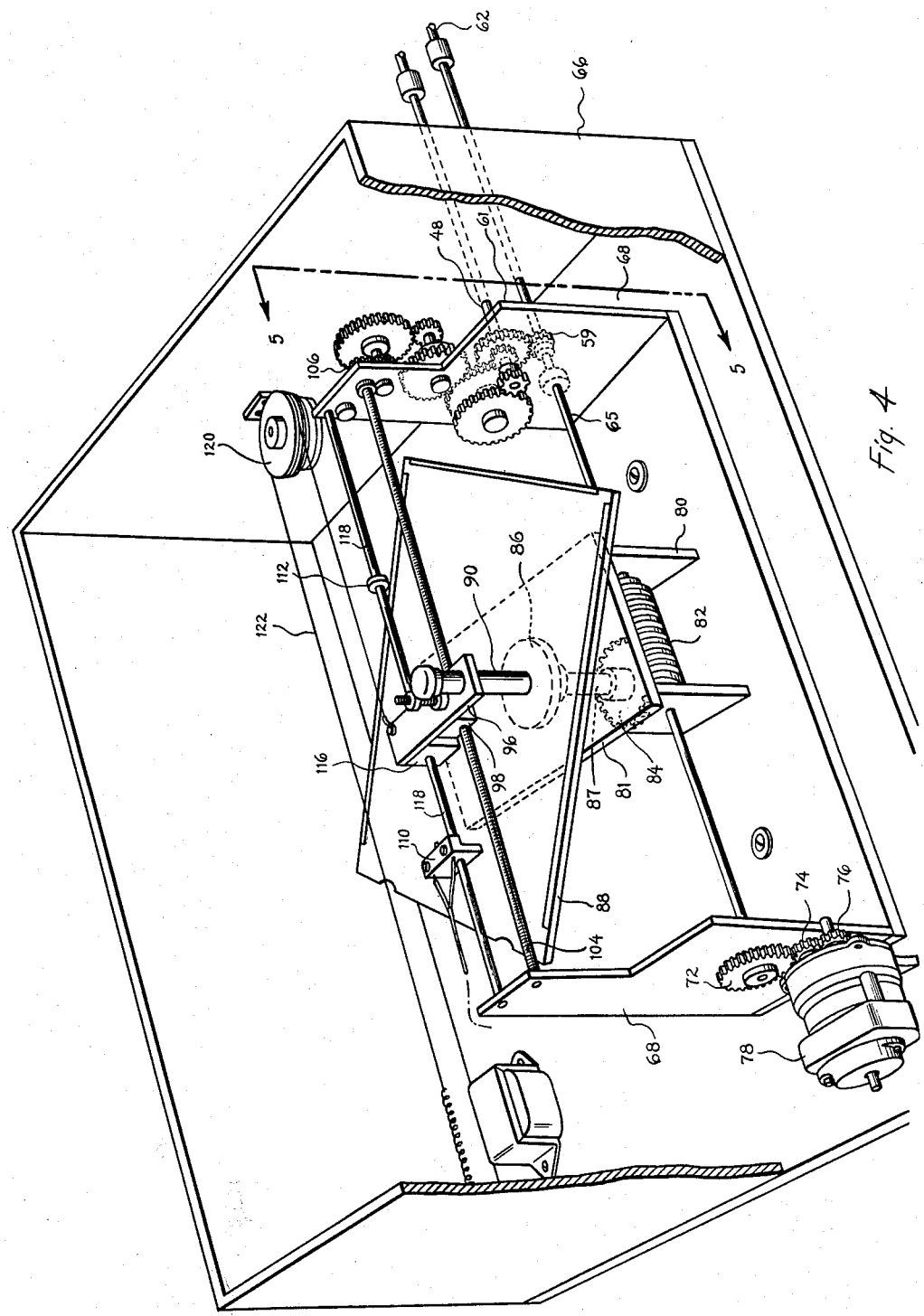
FIGURE 4 is a perspective view with parts broken away of a pole figure plotting apparatus which also is used in the embodiment of FIGURE 1.

FIGURE 4 shows the apparatus schematically represented at the right of FIGURE 1 for exposing the film in a manner such as to produce a pole figure trace representative of the orientation of the specimen in the goniometer of FIGURE 2. This mechanism is preferably contained within a lightproof box 66 having therein a pair of spaced-apart parallel supporting plates 68. A shaft 65 extends between the plates 68, 70 and has on its lefthand end a spur gear 72 which meshes through an idler gear 74 with a gear 76 on the output shaft of an electric motor 78. Shaft 65 is coupled externally of box 66 to the shaft 62 (FIGURE 2) to drive the worm 60 to cause rotation of the specimen plate 52 of the goniometer. The shaft 48, which rotates goniometer ring 30, is extended through the wall of box 66 and has a gear 61 on its end which meshes with a gear 59 on shaft 65. The ring 30 is thus rotated continuously while the specimen mounting plate is being rotated.

Intermediate its ends, a worm 82 is provided on shaft 65 between a pair of vertical support plates 80 and beneath a horizontal support plate 81. Worm 82 meshes with a worm gear 84 on a vertical shaft 87 extending through plate 81 and which has a circular plate 86 on its end which supports a film holder 88. It will thus be apparent that the rotation imparted to shaft 65 by motor 78 causes the film holder to rotate about an axis extending normally of its plane and causes the specimen support plate 52 to rotate about an axis extending normally of its own plane, the several gears and worms being chosen so that the angular velocity of these parts is the same.

A light housing 90 (FIGURE 7) comprising a cylindrical tube is mounted above the film holder in a plate 96 which is secured to a half nut 98 which rests on a threaded rotatable shaft 104. Housing 90, which is analogous to the housing 12, has an incandescent lamp 92 therein and a slit 94 to collimate the light emanating from the lamp so that a narrow beam of light is directed at the surface of the film. As shown in FIGURE 8, the half nut is secured to a rod which extends through an oversized opening in plate 96 and held in place by a spring and a pair of nuts on the rod to permit adjustment of the half nut a distance less than a thread pitch for zeroing purposes.

Plate 96 is secured at its opposite end from the light housing to a block 116 slidably mounted on a rod 118 extending between the opposed faces of the plate 68, 70. This arrangement prevents the plate 96 from tilting since the half nut 98 is not stable with respect to the threaded shaft 104.

Figure 5:
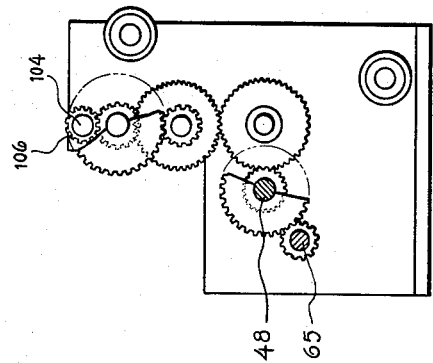
FIGURE 5 is a view taken along the lines 5—5 of FIGURE 4.

Shaft 104 is rotated by means of a gear train shown in FIGURE 5 including a spur gear 106 on the end of shaft 104, a spur gear on shaft 48 and a plurality of intermediate gears provided in order to obtain a suitable speed of the shaft 104 so that the light will traverse the distance from the center of the film to its edge while the specimen is being tilted through the requisite angle.

The light housing 90 thus moves along a straight line path while the motor 78 is running by virtue of the rotation of shaft 104 and the half nut 98. Since the film itself is rotated in its own plane during such movement of the light housing, it will be apparent that the beam of light which impinges upon the film will trace an Archimedean spiral path over the film surface. Stops 110, 112 may be provided on the rod 118 to limit the movement of the light, the stop 110 having a switch therein to turn off the light after the trace has been completed.

The incandescent lamp in the light housing is wired to the rate counter in any suitable manner so that its intensity will be proportional to the intensity of the reflected X-ray beam. One way of achieving this result is to employ a General Electric (U.S.A.) XRD-5 X-ray apparatus which includes a detector, amplifying means, a rate meter which produces an output voltage proportional to the rate at which X-rays are received by the detector, and a strip chart recorder. The shaft of the indicator of the recorder is used to control a variable resistor in a circuit for the light as shown in FIGURE 10. The strip chart recorder is not utilized as such in this arrangement which merely provides a convenient method of adapting the XRD-5 apparatus to the practice of the present invention. Obviously, alternative circuit arrangements can be used in which the voltage output of the rate meter directly controls the brightness of the light.

Since the X-ray reflection data are recorded on the film by variations in intensity of the light source, it will be apparent that ideally the relative speed of the light with respect to the film should be constant over the entire spiral path. In the disclosed apparatus, however, the relative speed of the light increases with respect to the film as the radius of the spiral increases since the angular velocity of the film remains constant. This factor introduces an error in that a given light intensity will produce a dark image near the center of the spiral (where the relative light-film speed is low) and a light or less intense image near the periphery of the spiral (where the relative light-film speed is high). A simple method of correcting for this error is to provide a rheostat 120 in series with the incandescent lamp in the housing 90 and a control cable 122 secured at one end through a spring 124 to the housing wall and at its opposite end to the plate 96. This control cable 122 extends around a pulley on the rheostat so that as the light housing moves relatively away from the origin of the spiral being traced, the resistance in the rheostat is reduced and the intensity of the light increases, other things being equal. Thus the variations in intensity caused by variations in the intensity of the reflected X-ray beam will be recorded accurately and will not be effected by any variation of relative linear speed of the light source relative to the film holder.

The operation of this embodiment of the invention to produce a pole figure for a given specimen merely involves then that the specimen be mounted on the mounting plate 52 of the goniometer, a fresh sheet of film be inserted in the film holder 88, and the light housing be located at the approximate geometric center of the film. Thereafter, the motor 78 is started and the specimen is rotated and tilted while the incident X-ray beam 6 impinges thereon. The reflected beam 8 is continuously detected and the information obtained by the detector is imparted to the light in the housing 90. The film is simultaneously continuously rotated at the same angular speed as the specimen 52 in its own plane and the light housing moves relatively over the surface of the film at a rate which is related to the rate of tilting. After the specimen has been tilted through the required number of degrees, usually 60°–80°, the film is removed from the film holder, developed, and printed to show a finished pole figure. An outstanding advantage of the invention is thus the fact that the technician need not take any readings or plot any data during the course of the test and the specimen can be scanned at a relatively high rate, that is the specimen can be rotated and tilted at a high rate since the recording of the data does not depend upon a relatively slow chart recording device.

It is pointed out above that the change in the relative linear speed of the light source with respect to the film would ordinarily introduce an error which can be eliminated by simply varying the fixed intensity of the light. Additional errors for which corrections must be made have been recognized in the art; for example, for each specimen there is a background correction which must be eliminated and a defocusing effect which introduces a progressive error as the specimen is tilted. The latter two errors, which are common to all X-ray pole figure techniques, can be simply elimniated in the practice of the instant invention by merely scanning a known sample having a random orientation of its crystalline grains, developing and printing the photographic film from this scanning of the known sample, and superimposing the unknown film, obtained in the scanning of the unknown specimen, on the photographic print of the known specimen. This method of correcting for background radiation and defocusing effect thus avoids any need for computations involving individual data points obtained.

FIGURE 9 shows a pen and ink drawing of an actual pole figure obtained in the practice of the instant invention. This pole figure shows a preferred orientation for the {111} planes of a 70–30 brass and was obtained by setting the angle $\theta$ and choosing the wave length $\lambda$ of the incident X-ray beam such that reflection would occur from the {111} planes of the specimen. The radial lines on meridians shown at 10° intervals represent the rotational orientation of the specimen about an axis extending through its own plane, the zero position (DR) representing the orientation of the specimen when the projection of the incident X-ray beam on the specimen is parallel to the direction of rolling. Thus, at 90° from the zero meridian, the X-ray beam projection on the specimen is transverse to the direction of rolling (TD). The concentric circles, the latitudes of parallel, represent the tilt orientation of the specimen from its initial starting position. Thus, the geometric center of the diagram represents the orientation of the specimen when its angle of tilt is 0° and when the incident X-ray beam projection is parallel to the direction of rolling.

The darkened areas on the pole figure which appear as a series of generally concentric arcuate segments are actually segments of the Archimedean spiral traced by the light during the rotation and tilting of the specimen. As explained above, during rotation and tilting of the specimen the specimen will rotate about the axis extending normally of its own plane at a much higher rate than it is tilted. It has been found, for example, that if the specimen is tilted through an angle of 2½° during each complete rotation of the specimen about the axis B—B through 360°, the arcuate segments produced on the film will be sufficiently close together to yield an adequate degree of definition in the finished pole figure for most purposes. Where, however, there is a highly preferred orientation of the crystallographic plane under investigation, it may be desirable to rotate the specimen about the axis B—B through a complete turn for each degree of tilt of the specimen. Obviously, the more the specimen is tilted during each degree of rotation, the faster a pole figure can be determined but the poorer the definition of the resulting pole figure.

Quite frequently, the preferred orientations for two or more crystallographic planes are represented on a single pole figure diagram. In the past, the determination of pole figures of this type showing preferred orientations of two or more planes has involved a complete study of the specimen for each plane, that is the Bragg angle $\theta$ for the one plane is set, the data are obtained on a strip chart while the specimen is rotated and tilted, and the data from the strip chart are then plotted on a stereographic chart. The process is then repeated, in this prior art method, for the second plane using appropriate Bragg angle for the investigation of that second plane. In the practice of the instant invention, pole figures for two or more planes can be obtained on a single sheet of film by using color film and separate color filters for each investigation. For example, if it is desired to determine the presence of preferred orientations of the {100} plane and the {111} plane of a particular specimen, the appropriate Bragg angle $\theta$ and wave length $\lambda$ would first be chosen for the {100} plane, a blue filter, would be placed in the light housing beneath the incandescent lamp, and the process described above of tracing a spiral on the film while the specimen was being investigated by the X-rays would be carried out. Thereafter, the light housing would be zeroed or indexed to its starting position, a red filter would be placed in the light housing, the appropriate Bragg angle for the {111} plane would be set, and the process would be repeated. Development of the film would then show the preferred orientations of these two planes by the color patterns on the film.

The apparatus of FIGURES 1-8 is particularly designed to obtain data by reflection of the X-rays off of the surface of the specimen. The invention is, however, equally applicable to the transmission method of X-ray examination of a metallic specimen. If the transmission method is used, a goniometer of the type shown in the Geisler Patent 2,713,125 would be employed rather than the goniometer of FIGURE 2.

If the data plotting device of FIGURE 4 is positioned remote from the goniometer of FIGURE 2, the cables 48, 62 can be flexible cables which do not require precise location of the two components. Alternatively, synchronized motors, such as Selsyn motors, can be utilized to drive the goniometer and the tracing device.

FIGURES 11 and 12 relate to an alternative embodiment of the invention and show a specimen holder used to produce a pictorial representation of the thickness of a plating metal for an area on the surface of the specimen as seen from above the surface. The pictorial representation in this case is a simple X—Y coordinate representation which shows comparative plating thicknesses over the area inspected, by the density of the resulting photographic film. The general principles of the thickness plating determination method employed are well known and need be described only briefly for purposes of the present specification.

In accordance with this known method, the area of the specimen being inspected is irradiated with white X-rays. The impinging X-rays have the effect of causing an X-ray fluorescence from the irradiated area and the fluorescent X-rays from the specimen will contain a characteristic radiation, as regards wave length and intensity, which is indicative of the plating thickness and the plating material. Thus, if this X-ray fluorescence is suitably analyzed, it will yield information concerning the thickness of the plating on the specimen.

The specimen 127, in FIGURE 11, is mounted on a specimen mounting plate 128 which in turn is secured to the end of a shaft 130. This shaft extends rotatably through a pair of parallel arms 132, 134 which are secured to a rotatable shaft 135 at their upper ends. Intermediate the arms 132, 134, a worm gear 136 is mounted on shaft 130 which meshes with a worm 138 on a transverse shaft 140 which extends between and is rotatably mounted between a pair of housing walls 142. On its lefthand end as viewed in FIGURE 11 the shaft 140 has a helical gear 144 thereon which meshes with a helical gear 146 on the end of a shaft 62'. The shaft 62' which corresponds to the shaft 62 of FIGURE 2 is coupled to the shaft 65 of the recording device of FIGURE 4 so that rotation of the shaft 65 causes rotation of the film about an axis extending through its own plane and at the same time causes rotation of the specimen about an axis extending through its own plane, the various gear ratios again being chosen to achieve the same angular velocity in the film and the specimen.

The arm 134 comprises one part of an L-shaped member having another arm 148 integral therewith which extends transversely of the shaft 135 and across the end of the plunger 150 of a conventional micrometer 152, this micrometer being contained and mounted in a suitable housing generally indicated at 154. The adjusting spindle 156 of the micrometer has a worm gear 158 on its end which meshes with a worm 160 on the end of a flexible shaft 48' which corresponds to the shaft 48 of FIGURE 4. Rotation of the shaft 48' thus has the effect of driving the micrometer plunger 150 rightwardly in FIGURE 11 to swing the L-shaped member 134, 148 in a clockwise direction about the shaft 135 and thereby to swing the specimen along an arcuate path of limited extent. A spring 161 normally biases the arms 132, 134 rightwardly and leftward movement of the shaft 130 and the specimen from the position of FIGURE 11 is permitted against the resilience of this spring.

The incident X-rays will impinge upon the surface of the specimen from directly above and will irradiate a substantial area; for example, a square having ½ inch sides on the surface of the specimen. A fixed collimating tube 162 mounted in a housing 164 is directed towards the surface of the specimen so that the X-ray fluorescence from a small part of the surface will be collimated and pass through the tube 162. Since the specimen is continually rotating about an axis extending through its own plane and is at the same time being moved along an arcuate path by virtue of the limited pivotal motion of the shaft 135, the collimator 162 will inspect X-ray fluorescence along a generally spiral path on the surface of the specimen. The path of inspection of the surface will not, in this case, be a perfect Archimedean spiral by reason of the fact that the specimen moves in its own plane along an arc rather than along a straight line, however, the error introduced is relatively small since the extent of the arc is extremely small as compared with the length of the arms 132, 134. An additional distorting effect is introduced by the relative movement of the worm gear 136 along the axis of shaft 140 during swinging of the arms 132, 134. This relative motion of the worm gear with respect to the worm results in less than 360° of rotation of the sample for every 360° of the sheet of film. This error is relatively small and can be disregarded for most purposes or can be corrected by the use of a suitable correcting grid superimposed on the resulting trace.

The X-ray fluorescence which passes through the collimator 162 is directed towards a fixed crystal in a goniometer (not shown) which in effect functions as a filter and permits passage of only the characteristic radiation which yields the information on the thickness of the plating of the specimen. The reflected X-rays from the goniometer after filtering are directed towards a detector as previously described, to an amplifier, to a rate meter, and control the intensity of the light source in the plotting device of FIGURE 4. In this case, the intensity of the fluorescent X-rays will be indicative of the thickness of the plating in the specimen so that the light source which exposes the film in the plotting device of FIGURE 4 will trace a latent image having an intensity or a degree of exposure which is indicative of the plating thickness.

As with the embodiment of FIGURE 1, the degree of definition achieved will be dependent upon speed of rotation of the specimen holder 128 relative to the speed with which it moves along its arcuate path. This embodiment of the invention in effect traces a contour map of the plating on the specimen and the map or plot will have a degree of definition which will be determined by the relative proximity of the adjacent turns of the spiral traced.

Alternative embodiments of the invention will be apparent from the foregoing description. For example, the principles of the invention can be utilized with an exploratory radiant energy source other than X-rays as a means for aerial plotting of topographic features or as a means of plotting the depth of a body of water directly from data received from a sonic depth finder. In the latter instance for example, a vessel carrying a sonic depth finder would travel a predetermined course over a given area and continuously record the depth of the water by means of the depth finder which in turn would control the intensity of the light source. The light source would be moved over a photographic film along a path corresponding to the course followed by the vessel thereby to produce a photographic record of the contour of the ocean bottom.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. Apparatus for plotting pole figures of polycrystalline materials to show preferred crystalline orientations in said materials comprising, a pole figure goniometer having means for rotating a specimen about a first axis and simultaneously tilting said specimen at a given angular rate about a second axis extending normally of said first axis, means for directing an X-ray beam towards said specimen, and detecting means for detecting the intensity of X-ray beams from said specimen, sensitized sheet holding means for holding a sensitized sheet, means for rotating said holding means in its own plane at the same angular velocity as said specimen is rotated, a light source directed at said holding means, means for moving said light source relatively along a straight-line path with respect to said sheet holding means, and means for varying the intensity of said light source in response to the intensity of X-rays from said specimen whereby, a sensitized sheet in said sheet holding means is exposed along a spiral path to produce a pole figure of said specimen.

2. Apparatus for plotting a stream of X-ray data from a specimen subjected to scanning X-radiation in accordance with a predetermined scanning plan comprising, a detector for continuously detecting X-rays from said specimen during scanning, photographic film holding means, a light source, means for scanning a sheet of film in said film holding means by said light source along a film scanning path which is coordinately determined by, and coordinately related to, said predetermined X-radiation scanning plan, and means for modulating the intensity of said light source in response to variations in the intensity of X-radiation detected by said detecting means.

3. A method of recording and plotting information obtained during the scanning of a specimen with X-radiation in accordance with a predetermined scanning plan having two positional variables, said method comprising the steps of detecting the intensity of X-rays from said specimen during scanning, varying the intensity of a light source in response to variations in intensity of X-rays from said specimen and moving said light source along a predetermined scanning path over a sensitized surface which path is coordinate translation of the two positional variables of said scanning pattern thereby to expose said sensitized surface to varying degrees corresponding to the intensity of said X-rays from said specimen with each coordinate location on said surface corresponding to a portion of said scanning plan.

4. A method as set forth in claim 3 wherein said predetermined scanning plan comprises simultaneous rotation of said specimen in its own plane and tilting of said specimen about an axis extending in its own plane relative the incident X-rays thereby to produce an orientation pole figure of said specimen.

5. A method as set forth in claim 3 wherein said predetermined scanning plan comprises scanning of the surface of said specimen along a path extending in the plane of said specimen.

References Cited by the Examiner

UNITED STATES PATENTS 3,117,226   1/64   Eichhorn et al. _____ 250—51.5

FOREIGN PATENTS 845,285   8/60   Great Britain.

OTHER REFERENCES

Holden: "A Spiral-Scanning X-Ray Reflection Goniometer for the Rapid Determination of Preferred Orientations," Review of Scientific Instruments, vol. 24, No. 1, January 1953, pp. 10–12.

RALPH G. NILSON, *Primary Examiner.*